Patented Apr. 24, 1945

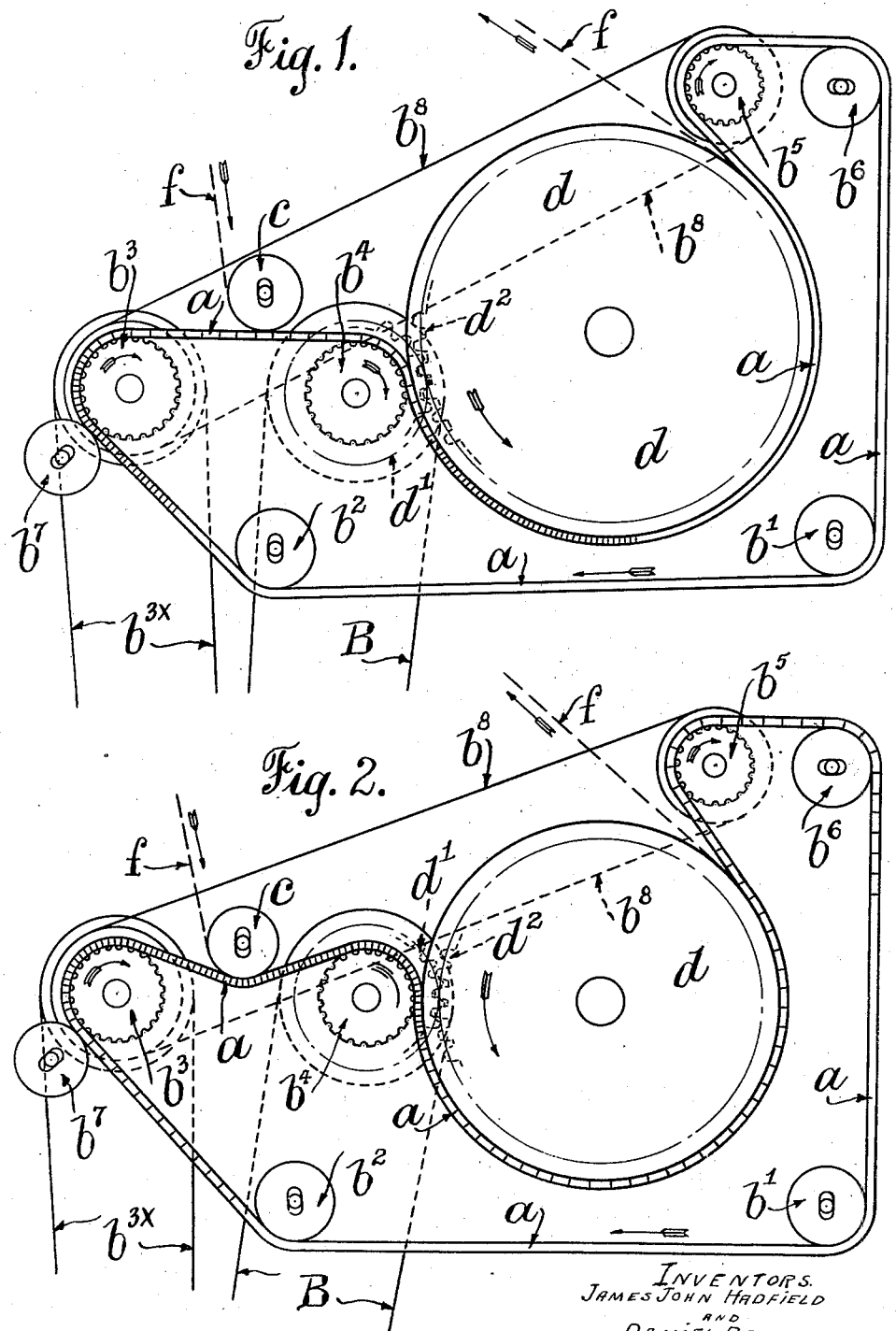

2,374,482

UNITED STATES PATENT OFFICE 2,374,482

APPARATUS FOR EFFECTING THE SHRINKING OR THE STRETCHING OF TEXTILE FABRICS

James John Hadfield, Disley, and Daniel Bamford, Middleton, England

Application August 14, 1943, Serial No. 498,712
In Great Britain February 18, 1943

2 Claims. (Cl. 26—18.6)

This invention relates to improvements in and connected with apparatus for effecting, and if need be regulating or controlling, the shrinking or the stretching of textile fabrics.

Various processes and machines have been devised for such purposes and the object is well known.

According to this invention, use is made of an endless flexible band of elastic material of some length and appreciable thickness, a vulcanized rubber band being most suitable. Said endless elastic band is supported on and is movable around revolvable rollers (certain of which are positively driven) and partly around a burnished and heated drying cylinder. The endless elastic band is caused to travel through a defined path, being driven by one roller at a certain speed and is then acted upon forward of said roller by another roller driven at a different speed, the relative speeds of the two rollers being advantageously variable at will.

The one driven roller which runs at a different speed to the other driven roller acts to stretch or contract a length or section of the endless elastic band between the said two driven rollers, so that, such length or section of the endless elastic band is subjected to considerable tension or is allowed to resile. Thereby a conditioned fabric delivered to that passing length or section of the endless elastic band, is directed down upon said length with said band in a state of stretch or contraction. When the operative length or section of endless elastic band ceases to be extended or becomes extended, then the conditioned fabric is either shrunk or stretched as the case may be.

This the fabric does, under the operative segment of a co-operating and burnished revolvable drying cylinder which acts on the fabric supported on the constantly recurring curved length or section of the endless elastic band whereby the recurring lengths of pre-conditioned and shrunk or stretched fabric passing through the machine are so acted upon as to render permanent the shrinking or stretching due to said drying cylinder acting upon said fabric between the operative part of the periphery of the drying cylinder and the grip of the length of the endless elastic band.

The apparatus combines an endless supported elastic band with adjustable guide rollers and certain driven rollers with driving mechanism for the latter, means to feed the fabric to be acted upon, a burnished drying cylinder to effect drying and to give succeeding lengths or sections of the endless elastic band a curved or concave disposition.

The improvements are hereafter described in detail and with reference to the accompanying drawing, wherein:

Fig. 1 shows the apparatus as devised to effect the shrinking of fabrics.

Fig. 2 shows the apparatus as devised to effect stretching of fabrics.

Referring to the drawing, the apparatus for effecting shrinking of the fabrics, as shown in Fig. 1, comprises an endless flexible and elastic band made of vulcanized india-rubber and of some appreciable thickness. This endless flexible and elastic band is marked $a$. It is supported by steel rollers $b^1$, $b^2$, $b^3$, $b^4$, $b^5$, $b^6$. These rollers are mounted in anti-friction bearings carried by the framework of the machine. The rollers or certain of them as for instance the rollers $b^1$, $b^6$ and $b^7$ are adjustable in their bearings to tension the endless flexible elastic band $a$ and they guide same in the desired path. The rollers $b^1$, $b^2$, $b^6$, are not positively driven. The rollers $b^3$, $b^4$, $b^5$ are positively driven by belt connections as hereinafter more fully described, and a further adjustable revolvable non-positively driven steel roller $b^7$ adjustably supported in anti-friction bearings acts against the roller $b^3$ upon the outer face of the endless flexible elastic band $a$. The roller $b^4$ is (preferably through known variable speed drive mechanism forming no part of this invention) actuated by a belt B and is driven at a faster speed than the driven roller $b^3$. For example, a "Reeves" variable speed gear may be used, such gear being well known. A variable speed mechanism is advantageously used, so that the relative speeds of the driven rollers $b^3$, $b^4$ can be instantly regulated at will to suit the character or condition of the fabric to be acted upon.

An adjustable roller $c$, which need not be positively driven, directs the pre-conditioned fabric $f$ and delivers same down onto the length of stretched endless flexible elastic band $a$ intermediate of the rollers $b^3$, $b^4$. Immediately forward of the roller $b^4$ is located a revolvable highly burnished and internally heated drying cylinder $d$. This cylinder $d$ is driven at the same surface speed as the roller $b^4$, as by gear wheels $d^1$, $d^2$ and is so disposed as to deflect each successive length of the endless flexible elastic band $a$ along with the length of intervening supported fabric $f$ into a curved or concave path, and so as to act upon each intervening passing length of fabric $f$ with object to render the shrinking permanent. The gear $d^1$ is fast on the shaft of roller $b^4$, which is driven by belt B from the variable speed gear of the Reeves device, as above stated. The shaft of the roller $b^3$ is preferably driven at a constant speed as by a belt $b^{3x}$, from a constant speed pulley carried by said Reeves device.

The driven roller $b^4$ is caused to bear towards the drying cylinder $d$ so as to nip the intervening endless flexible elastic band $a$ and fabric $f$. The speed of the driven roller $b^4$ is such as to drive the fabric conducting length of said band $a$ at a greater speed than occurs over the driven roller $b^3$. As a result, the descending and led-on conditioned fabric $f$ is laid upon that length of the elastic band $a$ which is in a state of considerable stretch so as to cling thereto in close contact in its conditioned state. When the endless flexible rubber band $a$ with its length of supported fabric passes beyond the nip of the faster running roller $b^4$ it at once loses the extra tension or stretch developed between rollers $b^3$, $b^4$ and so resiles in its passage around the drying cylinder $d$. In so doing, said band $a$ contracts the intervening length of conditioned fabric $f$ which latter is shrunk and its shrinkage made more or less permanent under the treatment and the drying action of the highly burnished and heated drying cylinder $d$ over the surface of which the fabric can slip as it contracts and shrinks with the contraction of the aforesaid band $a$ to which it adheres under the shrinking and drying treatment.

The action of the band $a$ which causes the shrinking of the fabric above described is illustrated in Fig. 2, from which it will be obvious that the amount of tension or stretch imparted to the band will be proportional to the relative speeds of the rollers $b^3$ and $b^4$.

To summarize: The conditioned fabric to be shrunk is delivered to the portion of the flexible and elastic rubber band between the rollers $b^3$ and $b^4$, and the two, i. e. the fabric and the elastic rubber band, are caused to pass around the periphery of the drying cylinder $d$. The elastic rubber band will resile or contract while in contact with the intervening fabric against the drying cylinder, and the amount of contraction of the band will be in proportion to or the same as the amount of stretch imparted to it due to the relative speeds of rollers $b^3$ and $b^4$. Therefore the amount of shrinkage of the fabric will be proportional to the amount of contraction of the elastic rubber band. Thus it will be seen that as the relative speeds of rollers $b^3$ and $b^4$ are varied so will the shrinking of the fabric be varied. In practice, conditions during shrinking of a fabric will vary according to the type of fabric being shrunk, and in order to prevent under-shrinking or over-shrinking of the fabric, the relative speeds of rollers $b^3$ and $b^4$ must be variable at will, so that the correct amount of shrinkage can be imparted to the fabric. This variation of the relative speeds of rollers $b^3$ and $b^4$ is accomplished by means of the Reeves gear, and the variation can be accomplished while the machine or apparatus is in operation. The roller $b^5$ is shown as driven through pulleys by means of a belt $b^8$ from the shaft of the roller $b^3$ and rotates at the same surface speed as roller $b^3$.

The shrunken fabric $f$ is led away to be further dried if necessary, and is then folded or batched in known way.

In case the apparatus is to be used for stretching textile fabrics, the arrangement as illustrated in Fig. 2 is used, and in such Fig. 2 like letters of reference are used to denote similar parts to those already referred to in connection with Fig. 1.

When stretching of the fabric is to be effected, which is the purpose of the apparatus shown by Fig. 2, the roller $b^4$ is run at the lower speed, whilst the roller $b^3$ is run at a higher speed, to stretch or extend the on-coming endless flexible and elastic band $a$ by acting thereon against the contacting roller $b^7$. The roller $b^5$ is also driven at approximately the same speed as the roller $b^3$. The roller $b^4$ is driven at a slower speed than roller $b^3$ preferably from any known variable speed driving mechanism acting on the belt B. Thus, the stretch of the endless flexible and elastic band $a$ between rollers $b^3$ and $b^4$ is allowed to resile or retract, so that, the conditioned fabric $f$ is laid by the fabric directing roller $c$ onto the slightly deflected stretch of belt $a$ which is at zero tension, as Fig. 2 indicates.

As the said stretch of band $a$ and the fabric $f$ laid thereon passes between the nip of the roller $b^4$ and the burnished heated drying cylinder $d$ the said band $a$ is immediately stretched or put under tension and consequently the conditioned fabric $f$ lying thereon is stretched and maintained under tension. To maintain this tension, as already stated, the rollers $b^3$, $b^5$ are caused to run at a sufficiently higher speed than the other rollers to effect such object. The roller $b^3$ is shown as driven at the requisite speed by a belt $b^{3x}$ whilst roller $b^5$ is shown as driven also at the requisite higher speed than the roller $b^4$ by means of a belt $b^8$ which drives through pulleys from the shaft of roller $b^3$ to roller $b^5$.

By driving through a variable speed mechanism as mentioned, adjustment of the speed of roller $b^4$ can be instantly regulated.

The stretching action resulting from the use of apparatus illustrated by Fig. 2 will be understood from what has already been explained, the aforesaid belt $a$ when it receives the fabric being at zero tension, said belt $a$ being under considerable tension forward of the nip of roller $b^4$ and the burnished heated drying cylinder $d$, so that, the fabric $f$ is stretched and fixed in passing around said cylinder $d$ from which it is led if necessary for further drying and for folding or batching.

If desired the variable speed driving mechanism may in either example of apparatus be applied in connection with and so as to govern the speed of the rollers $b^3$, $b^5$ relatively to the speed of the roller $b^4$.

By varying the relative speed of the actual operative or driving rollers the amount of the shrinking or stretching of the fabric can be regulated.

The rollers, or certain of them, such as those marked $b^3$, $b^4$, $b^5$, may be fluted or knurled to ensure an effective grip on the aforesaid belt $a$, as is indicated in Figs. 1 and 2.

We claim:

1. Apparatus for shrinking textile fabrics, comprising in combination an endless flexible and elastic band of substantial thickness, a plurality of rotatable rollers supporting and guiding said band, certain of said rollers being positively driven at relatively different speeds whereby that section of the band between said rollers is in a state of tension proportional to the relative speeds of the rollers, a burnished and heated drying cylinder disposed adjacent to one of said rollers for nipping the band between said roller and the cylinder and producing a relaxation of the tension on the band after its passage between said roller and cylinder, and means for delivering a textile fabric to that section of the band under tension between the rollers driven at different speeds.

2. Apparatus as set forth in claim 1, said cylinder being geared to said adjacent roller for rotation at the same surface speed, the position and diameter of the cylinder relative to said adjacent roller being such that the band in its passage from the roller to the cylinder is substantially diverted from its normal path.

JAMES JOHN HADFIELD.
DANIEL BAMFORD.